United States Patent

King, Jr. et al.

[11] 4,217,511
[45] Aug. 12, 1980

[54] STATOR CORE COOLING FOR DYNAMOELECTRIC MACHINES

[75] Inventors: Edward I. King, Jr., Monroeville; Brian J. Reed, Forest Hills, both of Pa.

[73] Assignee: Westinghouse Electric Corp., Pittsburgh, Pa.

[21] Appl. No.: 915,325

[22] Filed: Jun. 13, 1978

[51] Int. Cl.² .............................................. H02K 9/00
[52] U.S. Cl. .......................................... 310/55; 310/59
[58] Field of Search ....................... 310/55, 52, 58, 57, 310/60 R, 60 A, 64, 65, 194, 260, 214, 215

[56] References Cited

U.S. PATENT DOCUMENTS

| 2,618,756 | 11/1952 | Fechheimer | 310/65 |
| 2,920,219 | 1/1960 | Beckwith | 310/64 |
| 3,171,996 | 3/1965 | Alger | 310/65 |
| 3,431,443 | 3/1969 | Essen | 310/65 |
| 4,061,937 | 12/1977 | Goel | 310/65 |

*Primary Examiner*—R. Skudy
*Attorney, Agent, or Firm*—F. J. Baehr, Jr.

[57] ABSTRACT

Improved cooling is provided for the end regions of the stator cores of large dynamoelectric machines where substantial losses result from the presence of axial magnetic flux. Additional cooling is provided in the tooth portion of the end regions of the core by means of axial vents in the slots for flow of coolant gas between the winding conductors and the slot walls, thus cooling the teeth and reducing excessive heating, while the heated slot wall is spaced from the winding insulation and direct contact is prevented.

1 Claim, 7 Drawing Figures

STATOR CORE COOLING FOR DYNAMOELECTRIC MACHINES

BACKGROUND OF THE INVENTION

The present invention relates to the cooling of dynamoelectric machines, and more particularly to cooling the stator core end regions of machines of large size such as turbine generators.

In large synchronous machines, the currents in the end turn portions of the rotor winding and in the end portions of the stator windings have magnetic fields which combine to produce an axially-directed magnetic flux. This axial flux enters the end of the stator core in a direction generally perpendicular to the core laminations, and causes relatively large eddy currents in the end regions of the core since the core is not laminated in a direction to minimize these currents. The corresponding losses may be quite large, and often cause excessive heating in the end regions of the core which may be sufficiently severe to require undesirable limitations on the maximum rating obtainable from the machine. Furthermore, the loss tends to be concentrated at the surface of the stator teeth, due to the skin effect, so that the hot-spot in each tooth is at or near the surface of the slot wall, and the highest temperature portions of the teeth are thus in direct contact with the insulation of the stator windings, which tends to heat the insulation above the maximum permissible temperature and thus shortens its life. Conventional cooling systems do not substantially reduce this excessive heating in the core end regions, and it has remained a serious problem in the operation of large machines.

SUMMARY OF THE INVENTION

The present invention improves the cooling of stator core end regions by directly cooling the stator teeth where the loss is concentrated, and by removing the hot-spot regions of the teeth from contact with the stator winding insulation.

In accordance with the invention, these results are obtained by providing axial vents in the slots in the end regions of the core to allow coolant gas to flow directly in contact with the tooth surfaces between the slot wall and the winding conductor. This may be done by making the slots in the end pack or packs of stator laminations of greater transverse width than the slots in the main part of the core, either for the full depth of the slot or for certain parts of the slot wall, so that an axial vent space is provided extending through the slot between the winding conductor and the slot wall and communicating with one of the radial ducts in the core through which the coolant gas circulates. In this way, coolant gas flows in a generally axial direction through the vent in contact with the slot wall, so as to remove heat from the regions where the heat loss tends to be concentrated, and the vent also separates the winding insulation from the heated slot wall, thus protecting the insulation from excessive temperature.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
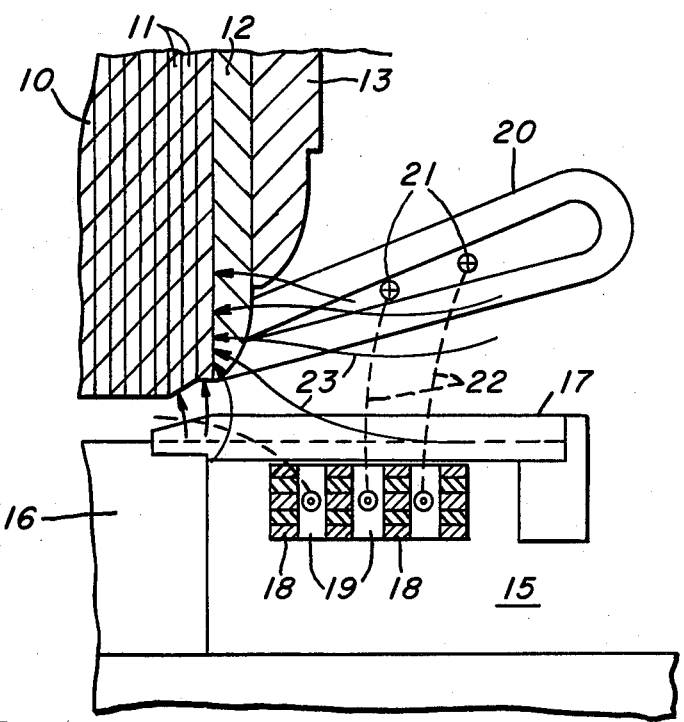
FIG. 1 is a fragmentary diagrammatic view of the end portion of a large synchronous machine, illustrating the problem.

As previously indicated, the present invention relates to the problem of excessive heating of the end regions of the stator cores of large machines, such as turbine generators. The cause of the problem is illustrated in the diagrammatic view of FIG. 1 which shows a section of one end of the stator core 10 of a large generator consisting of the usual packs of laminations 11 clamped between fingerplates 12 and end plates 13 at each end of the core. The rotor 15 is shown as having a body portion 16 and retaining rings 17 of usual construction. The rotor winding or field winding of the machine consists of copper conductors placed in longitudinal slots in the rotor body 16 and connected at the ends to form either two or four field coils. The end connections which complete the coils at each end of the rotor are indicated at 18 in FIG. 1 and extend circumferentially around the rotor, being supported by the retaining ring 17. The currents flowing in the end turn conductors 18, therefore, flow in a circumferential direction, with respect to the axis of the machine; as indicated by the current symbols 19 in FIG. 1.

The stator windings of the machine are disposed in longitudinal slots in the core 10 and extend out of the slots beyond the core into end turn portions 20. The end turn portion of each winding conductor, or half-coil, has a complicated shape which is not shown in the drawing, the end turn portions 20 being merely indicated diagrammatically. In actuality, each half-coil comes out of the slot in the axial direction and is then formed into a complex curve extending from a substantial distance around the core with its extremity extending outwardly to be joined to the end of another coil coming from a different slot. This results in a complicated curved configuration but most of the end portion of each coil extends generally circumferentially around the core. The currents in the end portions 20 of the stator winding, therefore, are predominantly in the circumferential direction, as indicated by the current symbols 21 of FIG. 1.

Since both the rotor currents and the stator currents are predominantly circumferential in the end region of the machine, their magnetic effect is equivalent to that of currents flowing in coils such as are indicated by the dotted lines 22. This results in the production of the magnetic fluxes indicated at 23 which extend generally axially of the machine. The stator winding currents are, of course, alternating currents and produce a corresponding alternating magnetic flux, while the rotor winding carries the direct current field excitation of the machine which reverses in polarity with respect to any given point on the stator either twice or four times in each revolution of the rotor, depending on the number of poles. The magnetic fluxes, therefore, combine to produce a pulsating, alternating flux 23 in the end region of the machine which is axial in direction and generally perpendicular to the stator core laminations, as indicated in FIG. 1. The magnetic flux penetrating the end portion of the core in this manner, perpendicular to the laminations, produces high eddy currents in the laminations. The core is not laminated in a direction to minimize these currents and very high losses occur, which results in excessive heating of the portion of the core penetrated by the flux. The magnitude of the loss varies, of course, with the flux density and the magnitude of the flux, which is affected by the phase relation between the stator winding current and the field current. It has been found, for example, that the flux density at leading power factor can be at least double the flux density at rated current and lagging power factor in a given machine. Since the heat loss generated in the core by the axial flux varies as the square of the flux, it will be evident that very high temperatures can be reached and that the temperature rise in the core end region may result in serious limitations on the maximum machine rating obtainable.

Figure 2:
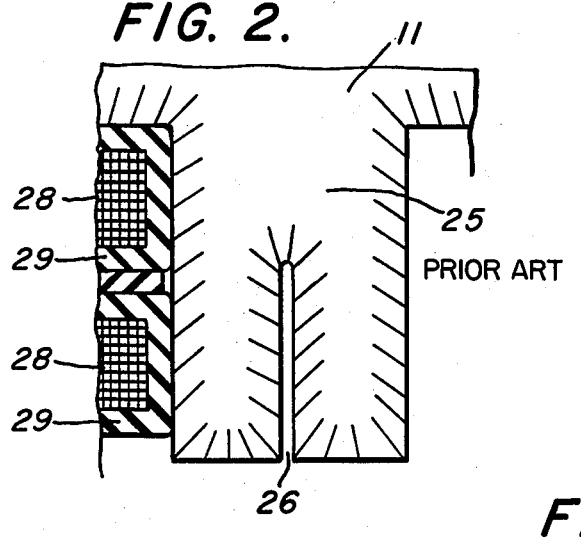
FIG. 2 is a diagrammatic view of a single stator core tooth of a conventional machine showing the heat distribution.

FIG. 2 illustrates the conditions in a single tooth 25 in the end region of the core. The laminated tooth 25 is shown as being of usual construction having a central slit 26 to divide the laminations into sections of smaller width receiving the axial flux and thus reducing axial flux caused loss. Even with these slits, the loss due to the axial flux entering the end region of the machine, as discussed above, results in additional losses in the core and these losses tend to be concentrated in the teeth and particularly at the surface of the teeth because of the skin effect which causes crowding of the flux to the surface. This region of concentrated loss and resulting high temperature is shown shaded in FIG. 2. This concentration of the loss results in very high temperatures at the surface of the tooth so that the slot wall formed by the tooth becomes very hot. The stator winding coils 28 are disposed in the slots formed between the teeth 25 of the core. These coils are usually stranded and encased in high-voltage ground insulation 29, and fit tightly in the slots so that they are substantially in direct contact with the slot walls throughout their length. The very high temperature of the slot walls in the end region of the core therefore is extremely undesirable as the insulation is heated above the permissible temperature limits and the life and integrity of the insulation are adversely affected.

Figure 3:
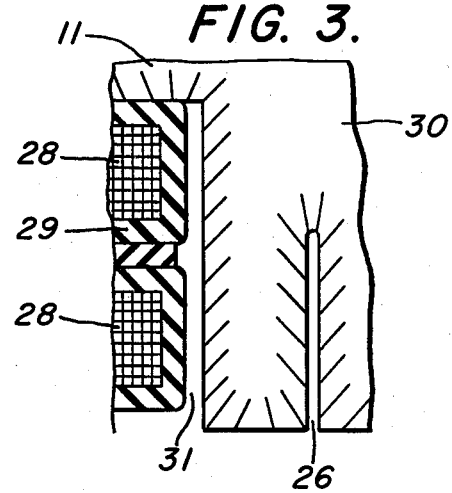
FIG. 3 is a similar view illustrating the principle of the cooling arrangement of the present invention.

FIG. 3 is a diagrammatic view similar to FIG. 2 but illustrating the principle of the present invention. As seen in FIG. 3, the tooth 30 is generally of the same configuration as the tooth of FIG. 2 and the coils 28 are, of course, the same. In FIG. 3, however, the tooth 30 is of less transverse width than the conventional tooth 25, so that the slots between adjacent teeth are wider and a space or axial vent 31 is provided between the coil and the slot wall. The vent 31 permits coolant gas to flow through the vent in a generally axial direction, or both axially and radially, and thus introduces a stream of coolant directly across the tooth surface where the highest temperatures occur, so that a large part of the heat is removed. Furthermore, the presence of the vent 31 spaces the coils 28 from the slot walls so that they are no longer in contact with these high temperature surfaces and the stream of coolant gas flowing through this space further protects the coil insulation from the high temperature. This arrangement, therefore, has the two effects of removing excessive heat to reduce the temperature of the core and also of protecting the stator coil insulation from damaging high temperatures.

Figure 4:
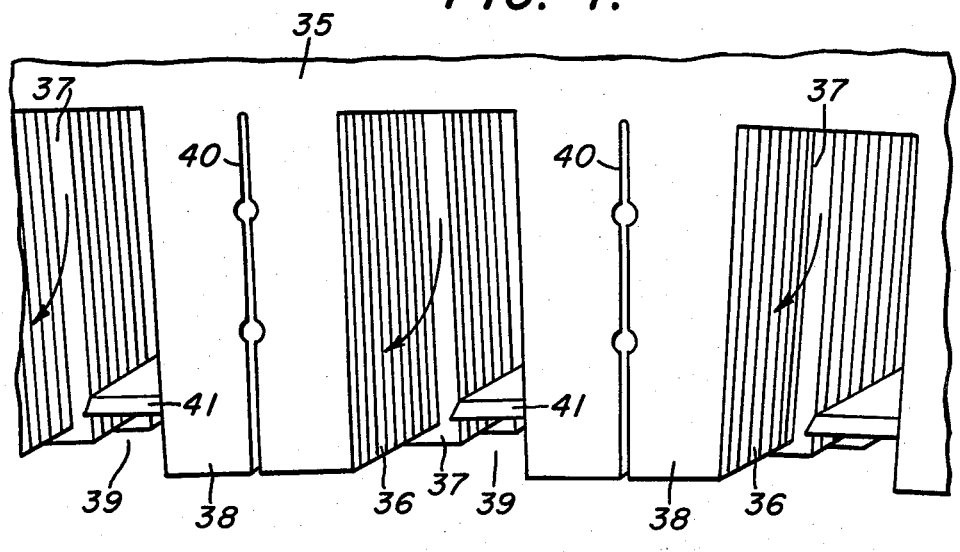
FIG. 4 is a perspective view of a portion of the end of a large stator core, illustrating one embodiment of the present invention.

FIG. 4 shows a portion of the end of a large stator core embodying the invention. As there shown, the core 35 is built up of a number of the usual packs of laminations 36 separated by radial ducts 37 for the flow of coolant gas, usually hydrogen. The laminations are provided with teeth 38 forming slots 39 between them, and the teeth are shown as having the usual radial slits 40 at the center of each tooth. The slots 39 contain the stator winding coils, such as the coils 28 shown in FIGS. 2 and 3, although the coils have not been shown in FIG. 4 for clarity of illustration. The winding conductors are, however, placed in the slots 39 in the usual manner and are retained in place by the usual wedges 41. In accordance with the invention, the teeth 38 in the end pack of laminations 36, at each end of the core 35, are made narrower in the transverse or circumferential direction of the core than the teeth in the rest of the core. The effect of this, as can be seen in FIG. 4, is to form wider slots 39 at the end of the core than throughout the remainder of the core. The conductors 28 fit tightly in the slots as previously described, while the greater width of the end portion slots results in forming vent spaces 31, as shown in FIG. 3, between the conductors and the slot walls in the end portion. The axial vent space thus formed communicates with the radial duct 37 so that some of the coolant gas flowing through the machine in the normal path is diverted into the axial vents 31 and flows generally axially between the conductors and the slot wall with the desired cooling effect discussed above.

Figure 5:
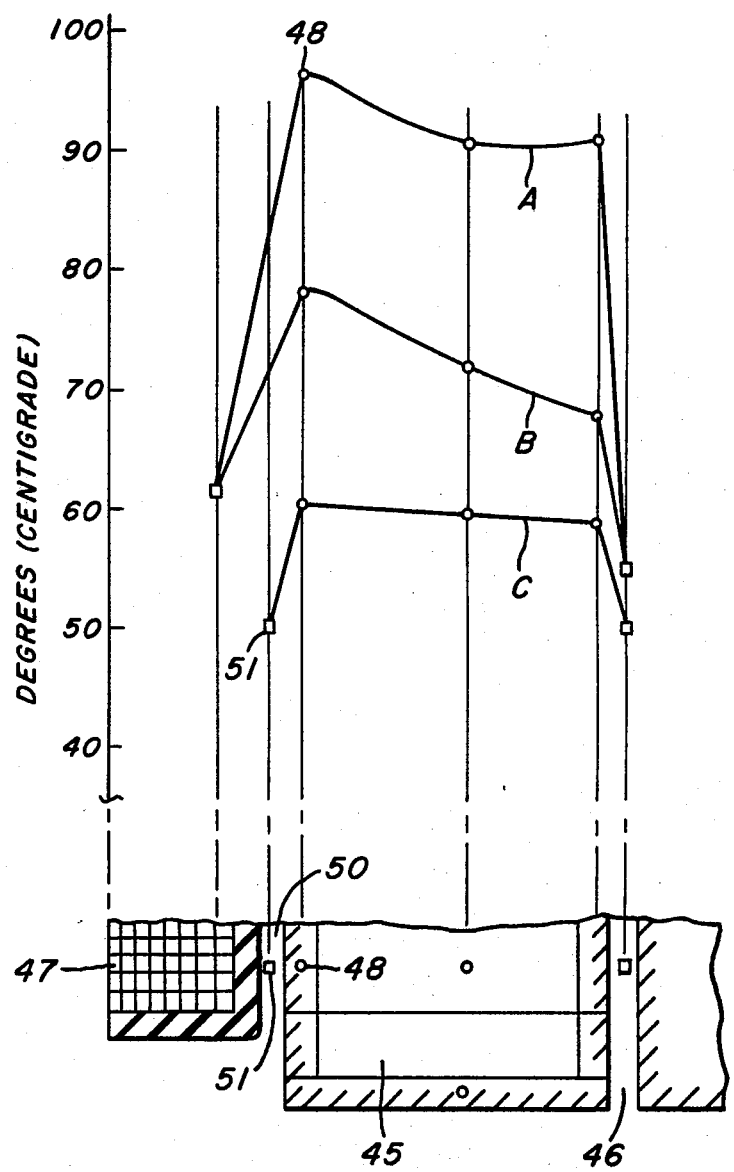
FIG. 5 is a diagram showing the temperatures in a stator tooth with and without the improvement of the invention.

The effectiveness of this cooling arrangement can be seen from the calculated temperature curves of FIG. 5. The upper part of this figure shows the temperatures at the corresponding points in the diagrammatically shown tooth 45 with a central slit 46 and with a conductor 47 in the slot adjacent to the tooth. The curve A represents the temperatures at the points indicated in the tooth for a conventional arrangement in which the conductor 47 is in direct contact with the slot wall, and with a coolant gas velocity of 2000 feet per minute flowing through the slit 46. The hot-spot temperature occurs at the point 48, and the very steep temperature gradient in the conductor insulation in readily apparent resulting from the extremely high slot wall temperature to which the insulation is subjected. The situation can be somewhat helped by increasing the velocity of coolant gas, as shown by the curve B, which is similar to curve A but with a gas velocity of 15,000 feet per minute in the slit 46. This increased flow of coolant gas reduces the hot-spot temperature substantially but it is still a dangerously high temperature to be applied directly to the insulation, and the heat loss is still quite high. The third curve C represents conditions with an axial vent 50 in accordance with the present invention between the slot wall and the conductor 47. It will be seen that the conductor hot-spot temperature at point 51 is reduced to little more than half of that shown by curve A, while the entire temperature curve is lowered to a level where the temperature rise of the core is not excessive. The temperature to which the insulation may be subjected has thus been greatly reduced while the insulation is removed from direct contact with the heated slot wall even at this lower temperature. The arrangement of the present invention is thus shown to be very effective in reducing the core temperature and in protecting the coil insulation from excessive temperatures.

Figure 6:
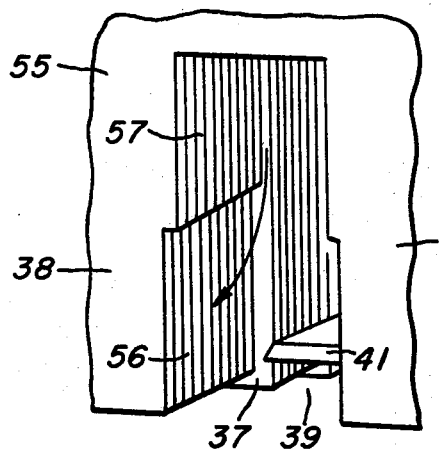
FIGS. 6 and 7 are fragmentary perspective views of the end of a stator core showing alternative embodiments of the invention.

It will be understood that various embodiments of the invention are possible. Thus, FIG. 6 shows a fragmentary view of a stator core 55 similar to the core 35 of FIG. 4. In the modification of FIG. 6, however, only the upper or radially inner half of the slot 39 is of increased width, as indicated at 56, while the lower half of the slot at 57 is of the same width as the slots in the rest of the core. The modification of FIG. 6 has the advantage that the support which is usually needed, or at least desirable, for teeth with axial slits is provided by the winding conductors for half of the radial length of the tooth, while at the same time the axial vent of the invention is also provided extending over the other half of the depth of the tooth. In this embodiment, the total flow of coolant gas through the axial vent formed by the tooth portion 56 would, of course, be reduced, as compared to that of FIG. 4, because of the reduced area of the vent, but the cooling effect is still very substantial and is obtained without sacrificing the desirable support of the tooth by the winding conductor.

Figure 7:
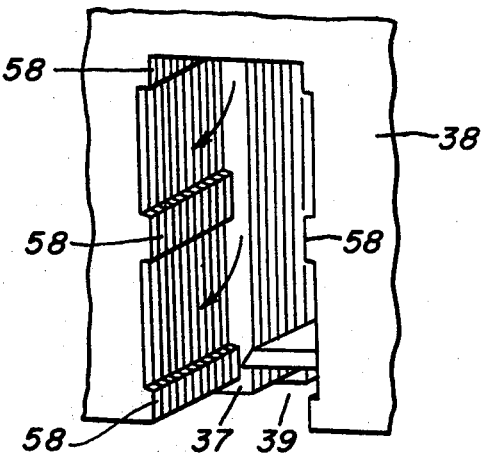

FIG. 7 shows another embodiment which may be considered a compromise between the structures of FIGS. 4 and 6. In FIG. 7, the slot 39 in the end pack of laminations is of greater width than the slots in the rest of the core, as described in connection with FIG. 4, but axial ribs or projections 58 are provided at spaced locations on each slot wall of sufficient size to make the spacing between opposite ribs the same as the width of the slots in the remainder of the core. Thus, the ribs 58 are in substantial contact with the winding conductors in the slots to provide the desired support for the teeth, but the spaces between the ribs provide axial vents for the flow of coolant gas and have the same desirable effects as the construction of FIG. 4. Other arrangements and constructions are, of course, possible to provide axial vents between the winding conductors and the slot walls in the end regions of a stator core to obtain the desirable cooling effects discussed above.

It will now be apparent that a construction has been provided for the tooth portions of the end regions of the stator cores of large dynamoelectric machines for effectively reducing the excessive temperatures and insulation heating caused in these regions by axial flux penetrating the core. The new structure is relatively simple and can be incorporated in the design of a machine without increasing the cost or affecting the coolant system in any way except for the diversion of a small amount of gas to flow through the axial vents. A very effective structure is provided, however, which greatly reduces the maximum temperatures reached in the tooth portions of the end regions of the core and which also protects the winding insulation in these regions from being directly exposed to undesirably high temperatures.

What is claimed is:

1. A dynamoelectric machine comprising a laminated stator core made up of packs of laminations having longitudinal slots with walls; insulating winding conductors disposed in said slots, said conductors being substantially in contact with the walls of the slots; axial vent means for flow of coolant gas between said conductors and the slot walls in the packs at the ends of the stator core; said packs of laminations being separated by radial ducts for flow of coolant gas; said axial vent means between the conductors and the slots walls of the packs at the ends of the stator communicating with the adjacent radial ducts and having substantially half of the radial extent of each slot wall substantially in contact with the conductor and the packs at the ends of the stator core and the other half of each slot wall is spaced from the conductor in the packs of laminations at the end of the stator to form said axial vent means.

* * * * *